(12) United States Patent
Bono

(10) Patent No.: US 9,041,742 B2
(45) Date of Patent: May 26, 2015

(54) DISPLAYING AN IMAGE BASED ON LAYERS OF A LAYER TREE

(71) Applicant: DeNA Co., Ltd., Tokyo (JP)

(72) Inventor: Hironori Bono, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 14/209,903

(22) Filed: Mar. 13, 2014

(65) Prior Publication Data

US 2015/0022553 A1    Jan. 22, 2015

(30) Foreign Application Priority Data

Jul. 22, 2013    (JP) .................. 2013-151455

(51) Int. Cl.
*G06T 11/00*    (2006.01)
*G06T 9/00*    (2006.01)
*G09G 5/377*    (2006.01)

(52) U.S. Cl.
CPC . *G06T 11/00* (2013.01); *G06T 9/00* (2013.01); *G06T 2210/61* (2013.01); *G09G 5/377* (2013.01)

(58) Field of Classification Search
None
See application file for complete search history.

(56) References Cited

U.S. PATENT DOCUMENTS

| | | | |
|---|---|---|---|
| 8,610,725 B2* | 12/2013 | Sandmel et al. | 345/501 |
| 2008/0186307 A1* | 8/2008 | Leifenberg | 345/419 |
| 2010/0045691 A1 | 2/2010 | Naito et al. | |
| 2013/0120401 A1* | 5/2013 | Borysenko et al. | 345/473 |

* cited by examiner

*Primary Examiner* — Jason M Repko
*Assistant Examiner* — Diane Wills

(57) ABSTRACT

An image is generated by: mutually associating an object associated with image data as a tree structure that has the object as a node; allocating an order value to a child node group of each parent node; distributing image data of an object of interest to a layer on the basis of the depth of the tree structure and the order value allocated to each node in a subtree going up from a node corresponding to the object of interest to a root node; and superimposing the layers.

12 Claims, 4 Drawing Sheets

DISPLAYING AN IMAGE BASED ON LAYERS OF A LAYER TREE

BACKGROUND OF THE INVENTION

1. Field of the Invention

The present invention relates to an image processing device and an image processing program which display an image by superimposing a plurality of layers.

2. Description of Related Art

There is known a method of constructing and displaying a single image by superimposing a plurality of layers when displaying an image on a display provided to a computer, a smartphone, a tablet or the like. That is, each layer is an image region like a transparent film where an image is fused such that a layer superimposed below each layer is seen through a transparent image region outside an image region corresponding to an opaque object of each layer. The layers can be superimposed on top of one another by changing the position of each layer relative to another layer, and an image of an object rendered in each layer can be arranged at a desired position by moving each layer in a sliding motion. Moreover, an image of an object rendered by changing the opacity of a layer can be made partially transparent.

In an electronic game, for example, a single image is constructed and displayed on the display by superimposing a layer in which a background image is rendered, a character layer in which an image of a character appearing in a game is rendered, an HUD layer in which an image indicating a condition or the like of a friend or enemy character is rendered, and the like.

In order to display an image effectively by replacing or changing an image in the image fused by superimposing the images in the plurality of layers, there is disclosed a technique where layout information and layer structure information are set for each layer (JP 2008-93391 W, for example).

SUMMARY OF THE INVENTION

The image processing method using a layer has been performed on the assumption that there is a plurality of layers, each of which is provided beforehand with an object to be rendered in the image.

There is however a plurality of objects included in the image, whereby it is desired to provide a technique that properly allocates a set of these objects to the layers and efficiently renders the image.

One aspect of the present invention is an image processing device that includes a storage unit which stores an object database in which an object associated with image data is mutually associated as a tree structure having the object as a node and, at the same time, an order value is allocated to a child node group of each parent node. The image processing device refers to the object database, distributes image data of an object of interest to a layer on the basis of a depth of the tree structure and an order value allocated to each node in a subtree going up from a node corresponding to the object of interest to a root node, and generates an image by superimposing the layers.

Here, it is preferred that image data of an object having a layer value L that is within a predetermined range be distributed to the same layer, the layer value being represented by $$L = A \cdot \sum_{i=0}^{k} X_i \cdot B^{-i} \qquad \text{[Expression 1]}$$

where "i" denotes the depth of a node, "$X_i$" denotes an order value of a node having the depth equal to "i", each of "A" and "B" denotes a constant, and "k" denotes the depth of the node corresponding to the object of interest.

It is also preferred that the constant B have a value greater than the maximum value of the order value.

It is also preferred that the constant A satisfy the relationship represented by $$A \leq \frac{L\max}{\left(\sum_{i=0}^{k} X_i \cdot B^{-i}\right)\max} \qquad \text{[Expression 2]}$$

where "Lmax" denotes the maximum number of layers to be processed and "$(\Sigma X_i \cdot B^{-i})$ max" denotes the maximum value of "$\Sigma X_i \cdot B^{-i}$".

It is also preferred that the order value be changed dynamically.

It is also preferred that an attribute value of an object be allocated to a parent node of the tree structure and that a child node group of each parent node is formed of an object group having a common attribute value. For example, it is preferred that the attribute value include a background, a character, and an HUD.

Another aspect of the present invention is an image processing program which causes a computer to: refer to an object database; distribute image data of an object of interest to a layer on the basis of a depth of a tree structure and an order value allocated to each node in a subtree going up from a node corresponding to the object of interest to a root node; and generate an image by superimposing the layers, where the computer includes a storage unit which stores the object database in which an object associated with image data is mutually associated as the tree structure having the object as a node and, at the same time, the order value is allocated to a child node group of each parent node.

The present invention allows for the effective generation of an image by properly allocating the plurality of objects to the layers and superimposing the layers in which the image of each object is rendered.

DETAILED DESCRIPTION OF THE INVENTION

Figure 1:
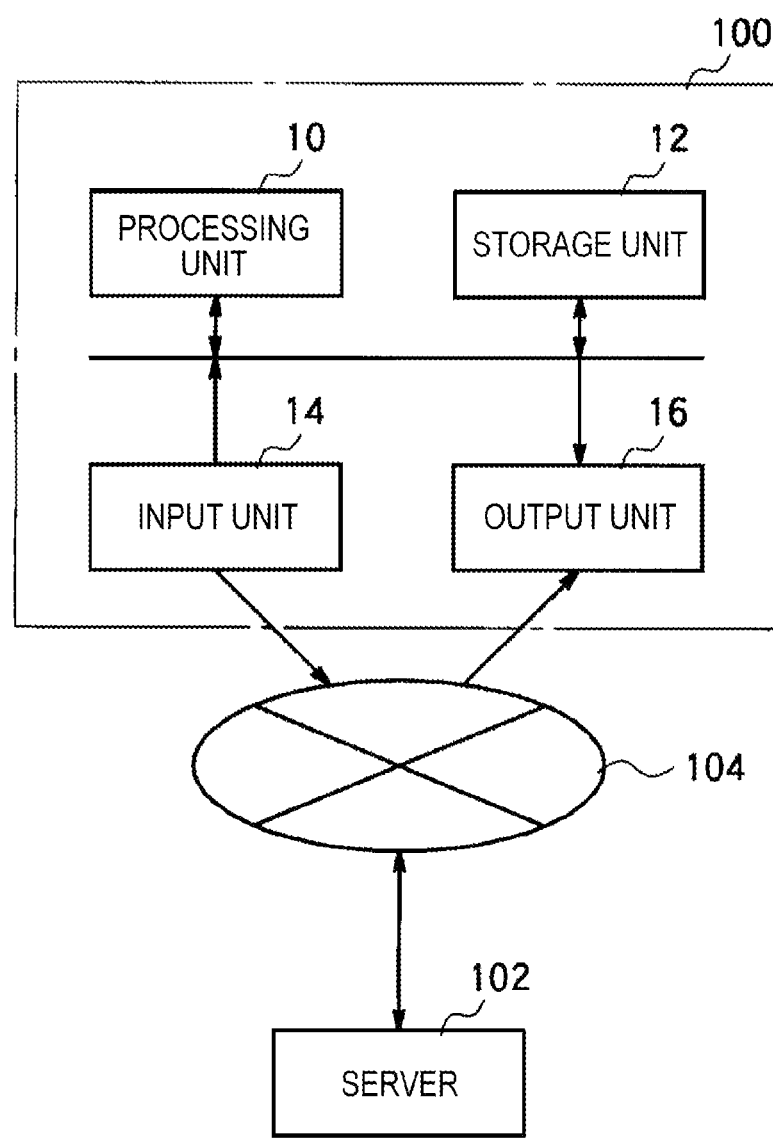
FIG. 1 is a diagram illustrating the configuration of an image processing device according to an embodiment of the present invention.

An image processing device 100 according to an embodiment of the present invention includes a processing unit 10, a storage unit 12, an input unit 14, and an output unit 16, as illustrated in FIG. 1. That is, the image processing device 100 includes the basic configuration of a computer and can be implemented by a general PC, smartphone, tablet, mobile phone, or the like.

The image processing device 100 is connected to a server 102 through a network 104 such as the Internet and performs processing by receiving information from the server 102. The image processing device 100 receives a program (logic) of an electronic game from the server 102 to perform processing in the game according to the program (logic), for example.

The processing unit 10 includes means such as a CPU that performs arithmetic processing. The processing unit 10 performs image processing according to the present embodiment by executing an image processing program stored in the storage unit 12. The storage unit 12 includes storage means such as a semiconductor memory or a hard disk. The storage unit 12 is connected to the processing unit 10 in an accessible manner and stores the image processing program, image data of each object used in the image processing, and an object database in which the object is managed. The input unit 14 includes means that inputs information to the image processing device 100. The input unit 14 includes a touch panel or a keyboard that accepts input from a user, for example. The input unit 14 further includes a network interface or the like that receives information from outside the image processing device 100, and receives the image processing program and the image data of each object used in the image processing. The output unit 16 includes means that outputs information processed by the image processing device 100. The output unit 16 includes a display that presents an image to the user, for example. The output unit further includes a network interface or the like that transmits information to the outside of the image processing device 100 and transmits information to the server 102 or the like.

In the present embodiment, there will be described an example where the image processing device 100 performs image processing in the electronic game. Note that another example can be applied as long as it employs the image processing method in which a plurality of layers is superimposed to be displayed.

Figure 2:
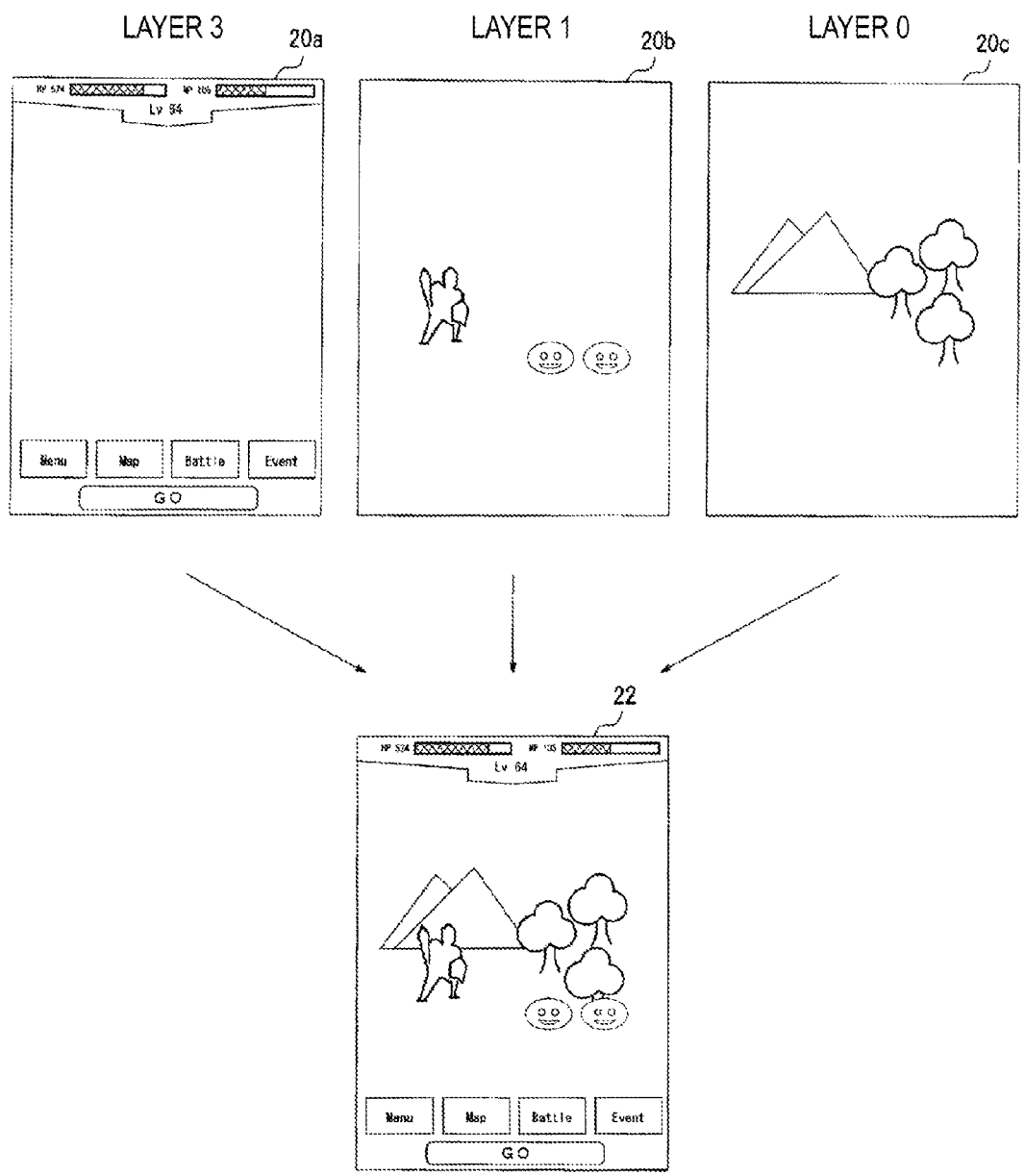
FIG. 2 is a set of diagrams illustrating the construction of an image according to an embodiment of the present invention.

FIG. 2 is a set of diagrams illustrating an example of the construction of an image 22 in the image processing device 100. The image 22 displayed in the output unit 16 of the image processing device 100 is constructed by superimposing and fusing a plurality of layers 20 (20a, 20b, 20c, and the like).

A single or a plurality of objects is allocated to each layer 20. An object is a concept representing an attribute of an image to be displayed. The object in the electronic game, for example, has an attribute value such as a background, a character, or an HUD. An object to which the background is assigned as the attribute value is represented as an object group having a common attribute as the background such as a mountain, a tree, a road, or a house. An object to which the character is assigned as the attribute value is represented as an object group having a common attribute as the character such as a friend character or an enemy character that appears in a game. An object to which the HUD is assigned as the attribute is represented as an object group having a common attribute as the HUD such as a hit point display part or a magic point display part.

Each layer 20 corresponds to a single image, where image data of an object allocated to each layer 20 is rendered.

Priority regarding the superimposition of the layers 20 is set to each layer 20. The layer 20 with high priority is superimposed above the layer 20 with low priority when constructing a fused image by superimposing the plurality of layers 20.

That is, in a case where there is an overlap between images of the objects rendered in the plurality of layers 20 being superimposed, the fused image is constructed by prioritizing the image in the layer 20 with higher priority. A region where the image data of the object is not rendered in each layer 20 is left as a transparent region. As a result, the fused image is constructed such that the image rendered in the lower layer 20 can be seen through the upper layer 20 when there is no overlap between the images rendered in the plurality of layers 20 being superimposed.

The image 22 is fused when a layer 3 (20a), a layer 1 (20b), and a layer 0 (20c) are superimposed as illustrated in FIG. 2, for example, where the priority of each layer is set in this order. That is, the image is fused such that the image rendered in the layer 3 is preferentially displayed when the images rendered in the layers 0 and 1 overlap the region corresponding to the image rendered in the layer 3. Moreover, the image is fused such that the image rendered in the layer 1 is preferentially displayed when the image rendered in the layer 0 overlaps the region corresponding to the image rendered in the layer 1.

In the present embodiment, an object to be displayed is managed in the object database having a tree structure.

Figure 3:
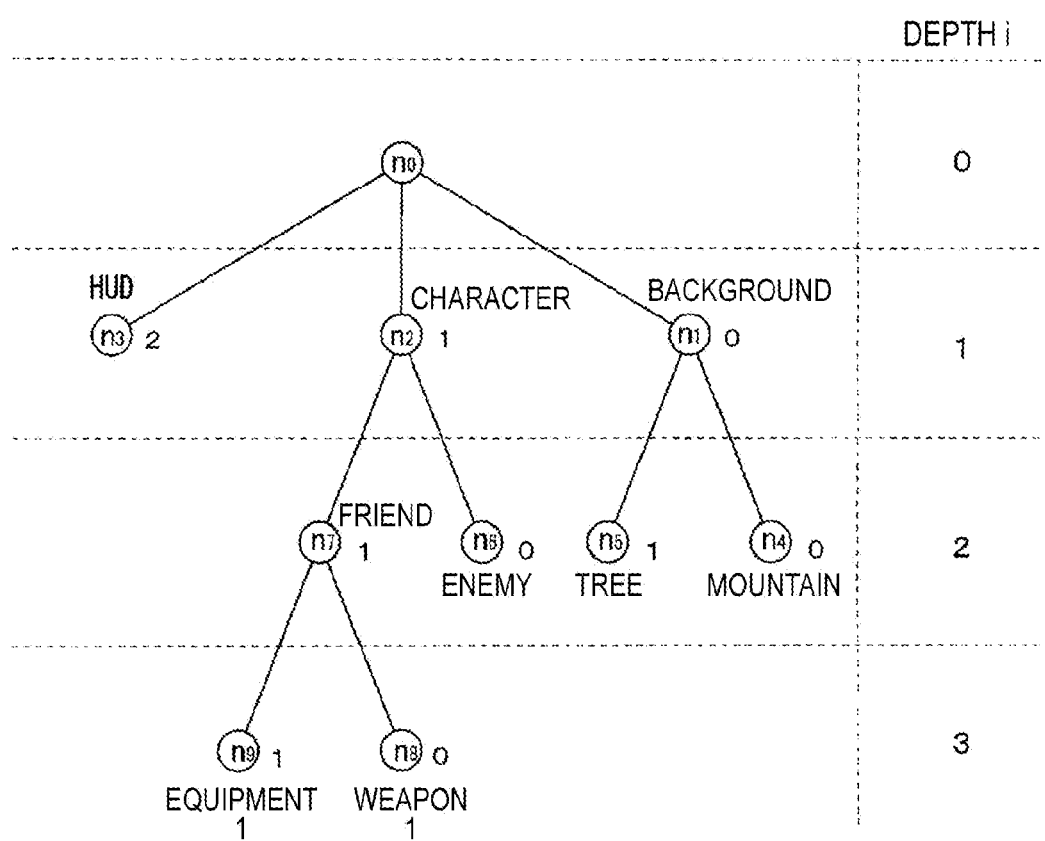
FIG. 3 is a diagram illustrating a tree structure of an object database according to an embodiment of the present invention.

FIG. 3 illustrates an example of the tree structure of the object database. The tree structure is represented by a node $n_m$ (also referred to as a knot or a vertex) and an edge (also referred to as a branch or a side) which connects each node $n_m$. Here, the letter "m" corresponds to a serial number of the node included in the tree structure.

Each node $n_m$ may have a child node. The child node is positioned below a parent node in the tree structure. Child nodes having the same parent node are called sibling nodes. At this time, the number of edges included from a root node at the uppermost position to a node of interest is called a "depth i" (where "i" is an integer greater than or equal to 0) of the node. An order value X is assigned to a child node group belonging to each parent node.

A single object is allocated to a single node in the tree structure of the object database. FIG. 3 illustrates the example where the objects "background", "character", and "HUD" are allocated to nodes $n_1$, $n_2$, and $n_3$, respectively. With the node $n_1$ of the object "background" serving as a parent node, objects "mountain" and "tree" belonging to the node $n_1$ are allocated to nodes $n_4$ and $n_5$, respectively. With the node $n_2$ of the object "character" serving as a parent node, objects "enemy character" and "friend character" belonging to the node $n_2$ are allocated to nodes $n_6$ and $n_7$, respectively. With the node $n_7$ of the object "friend character" serving as a parent node, objects "weapon 1" and "equipment 1" belonging to the node $n_7$ are allocated to nodes $n_8$ and $n_9$, respectively. Likewise, an object may be allocated to even more nodes. The object is managed in the tree structure, thereby making it easier to dynamically move the parent node and the node therebelow (the child node and a grandchild node) according to the priority.

Moreover, the order value is allocated to each node according to a game program. The order value represents the relative priority set between child nodes having the common parent node with respect to image display. The order value need not be a serial number. Moreover, the order value assigned to each node may be changed as appropriate. That is, the order value may be dynamically changed when the display priority is changed according to the game program because the order value represents the relative priority set between the child nodes having the common parent node with respect to the image display.

FIG. 3 illustrates the example where the nodes $n_1$, $n_2$, and $n_3$ immediately below the root node have a depth equal to 1 and are assigned order values 0, 1, and 2 (a numeric value written on the right side of each node in the figure), respectively. That is, the relative priority among the nodes $n_1$, $n_2$, and $n_3$ with respect to the image display is set to be node $n_3 > n_2 > n_1$. The nodes $n_4$ and $n_5$ below the node $n_1$ have a depth equal to 2 and are assigned order values 0 and 1, respectively. That is, the relative priority between the nodes $n_4$ and $n_5$ with respect to the image display is set to be node $n_5 > n_4$. The nodes $n_6$ and $n_7$ below the node $n_2$ have a depth equal to 2 and are assigned order values 0 and 1, respectively. That is, the relative priority between the nodes $n_6$ and $n_7$ with respect to the image display is set to be node $n_7 > n_6$. The nodes $n_8$ and $n_9$ below the node $n_7$ have a depth equal to 3 and are assigned order values 0 and 1, respectively. That is, the relative priority between the nodes $n_8$ and $n_9$ with respect to the image display is set to be node $n_9 > n_8$.

In the present embodiment, the tree structure of the object database is referenced in order to distribute image data corresponding to an object of interest to the layer on the basis of a depth k of the tree structure and an order value X allocated to each node in a subtree going up from the node corresponding to the object of interest to the root node.

Specifically, an object having the layer value L within a predetermined range is distributed to the same layer, the layer value being represented by expression (1) below.

[Expression 3]

$$L = A \cdot \sum_{i=0}^{k} X_i \cdot B^{-i} \quad (1)$$

where "i" denotes the depth of the node, "$X_i$" denotes the order value of the node having a depth equal to "i", each of "A" and "B" denotes a constant, and "k" denotes the depth of the node corresponding to the object of interest.

In other words, the layer value L is calculated by: calculating the sum of a value obtained by multiplying, by $B^{-i}$, the order value $X_i$ of all nodes along the path of the subtree including the root node $n_0$ of the tree structure of the object database down to the node $n_m$ to which the object of interest is allocated; and multiplying the sum by the constant A. The layer to which the object of interest is allocated is determined according to the layer value L being calculated.

Figure 4:
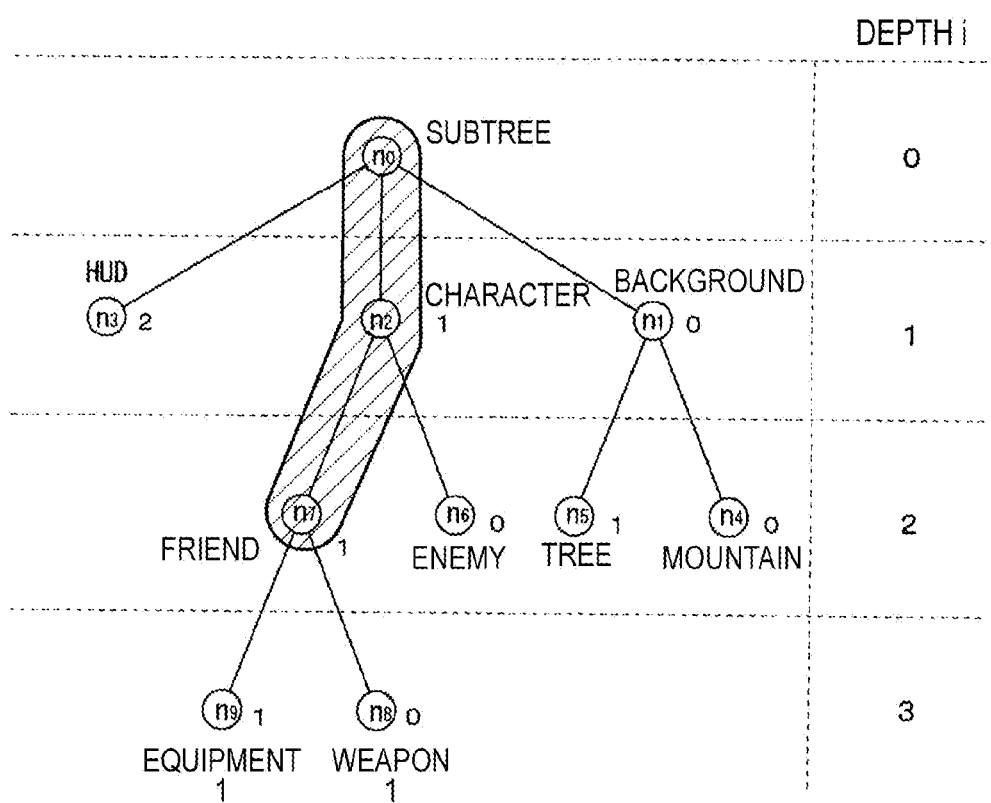
FIG. 4 is a diagram illustrating a method of calculating a layer value L according to an embodiment of the present invention.

There will be described an example of calculating, where the constant A equals 15 and the constant B equals 10, the layer value L of the node $n_7$ to which the object "friend character" is allocated in the example illustrated in FIG. 3. As illustrated in FIG. 4, there exists the node $n_2$ to which the "character" is allocated and the node $n_7$ to which the "friend character" is allocated along the path of a subtree including the root node $n_0$ down to the node $n_7$ of interest. Accordingly, the sum of the product of the order value 1 and $10^{-1}$ for the node $n_2$ and the product of the order value 1 and $10^{-2}$ for the node $n_7$ equals 0.11, which is then multiplied by the constant "15", whereby the layer value is calculated to be L=1.65. The layer value L of another node can be calculated in the similar manner, where the layer value equals 0 for the node $n_1$, 1.5 for the node $n_2$, 3 for the node $n_3$, 0 for the node $n_4$, 0.15 for the node $n_5$, 1.5 for the node $n_6$, 1.65 for the node $n_8$, and 1.665 for the node $n_9$.

The object allocated to each node $n_m$ can be distributed to each layer on the basis of the layer value calculated above. The object is distributed to each layer according to the integer portion of the layer value being calculated, for example. Specifically, the object can be distributed to the layer 0 when the layer value is 0 or greater and less than 1, the layer 1 when the layer value is 1 or greater and less than 2, a layer 2 when the layer value is 2 or greater and less than 3, and the layer 3 when the layer value is 3 or greater. As a result, the nodes $n_1$, $n_4$, and $n_5$ are allocated to the layer 0, the nodes $n_2$, $n_6$, $n_7$, $n_8$, and $n_9$ are allocated to the layer 1, and the node $n_3$ is allocated to the layer 3. That is, the layer value of each object is adjusted to an integer value by rounding up the decimals, whereby each object is allocated to a layer having the integer value as the layer number.

However, the method of distributing the object to the layer according to the layer value is not limited to what is described. Another method may be employed as long as the object having the layer value L within the predetermined range is distributed to the same layer.

Rendering is performed in the layer corresponding to the node to which the object is allocated, when rendering an image of each object. In the example of the object database illustrated in FIG. 3, an image of the object "mountain" is rendered in the layer 0 to which the node $n_4$ is allocated, when it is instructed to render the object "mountain" corresponding to the node $n_4$. Likewise, the object "tree" corresponding to the node $n_5$ is rendered in the layer 0. Rendered in the layer 1 are the object "enemy character" corresponding to the node $n_6$, the object "friend character" corresponding to the node $n_7$, the object "weapon 1" corresponding to the node $n_8$, and the object "equipment 1" corresponding to the node $n_9$. The object "HUD" corresponding to the node $n_3$ is rendered in the layer 3. When there is no layer to which the node to be rendered belongs, a new layer is inserted so that an image of an object corresponding to the node is rendered in the new layer. Moreover, the layer value of each object is re-calculated when the order value of each object is changed or when an object is newly added or deleted, in which case the object can belong to a different layer.

There can be constructed the image to be displayed in the output unit 16 by fusing the layers in accordance with the priority after rendering the image of the object allocated to each layer as described above.

Here, it is preferred that the constant B have a value greater than the maximum value of the order value assigned to the node. It is preferred to set the constant B greater than or equal to 3 when the maximum value of the order value equals 2, for example. It is more preferred to set the constant to a value greater than the maximum value of the order value in the future while anticipating the increase in the number of objects in the future. While the maximum value of the order value is currently 50, it is preferred to set the constant B to 100 when the maximum value of the order value is anticipated to be 99 in the future, for example.

Moreover, it is preferred that the constant A be set to a value satisfying expression (2) below.

[Expression 4]

$$A \leq \frac{L\max}{\left(\sum_{i=0}^{k} X_i \cdot B^{-i}\right)\max} \quad (2)$$

where "Lmax" denotes the maximum number of layers to be processed, and "$(\Sigma X_i \cdot B^{-i})$ max" denotes the maximum value of "$\Sigma X_i \cdot B^{-i}$".

It is preferred that the constant A equal 15 or less when the maximum number of layers Lmax constructing the display image equals 3 and the maximum value of "$\Sigma X_i \cdot B^{-i}$" equals 0.2, for example. As a result, the layer value L calculated by expression (1) can be less than or equal to the maximum number of layers Lmax by setting the constant A in this manner, whereby all the objects can be certainly allocated to any of the layers.

The image processing device 100 according to the present embodiment does not require re-rendering of an image in the layer in which the image of the object need not be updated, thereby allowing the cached layer to be reused and the processing load to be reduced. When the image of the object needs to be updated, one can easily find the layer in which the object to be updated is allocated by calculating the layer value of the node to which the object is allocated. Therefore, the management of the object is made easy and, in the electronic game or the like using a number of objects in particular, the image processing load can be reduced.

What is claimed is:

1. A non-transitory computer-readable storage medium storing an image processing program which causes a computer to perform operations, the operations comprising:
   referring to an object database stored within a storage unit of the computer, the object database including objects associated with image data that are mutually associated as a tree structure having an object as a node and order values allocated to a child node group of each parent node of the tree structure;
   distributing image data of an object of interest to a layer on a basis of a depth of a tree structure and an order value allocated to each node in a subtree going up from a node corresponding to the object of interest to a root node;
   wherein distributing the image data includes:
   distributing image data of objects having a layer value L within a predetermined range to the same layer, the layer value L of the objects being calculated using the following formula:

$$L = A \cdot \sum_{i=0}^{k} X_i \cdot B^{-i}$$

where "i" denotes a depth of a node, "$X_i$" denotes an order value of a node having a depth equal to "i", each of "A" and "B" denotes a constant, and "k" denotes a depth of the node corresponding to the object of interest; and
   generating an image by superimposing the layers.

2. The non-transitory computer-readable storage medium of claim 1, wherein the constant B has a value greater than the maximum value of the order value.

3. The non-transitory computer-readable storage medium of claim 1, wherein the constant A satisfies a relationship represented by:

$$A \leq \frac{Lmax}{\left(\sum_{i=0}^{k} X_i \cdot B^{-i}\right)max}$$

where "Lmax" denotes the maximum number of layers to be processed and "$(\Sigma X_i \cdot B^{-i})$ max" denotes the maximum value of "$\Sigma X_i \cdot B^{-i}$".

4. The non-transitory computer-readable storage medium of claim 1, wherein the order values are changed dynamically.

5. The non-transitory computer-readable storage medium of claim 1, wherein an attribute value of an object is allocated to a parent node of the tree structure, and a child node group of each parent node is formed of an object group having a common attribute value.

6. The non-transitory computer-readable storage medium of claim 5, wherein the attribute value includes a background, a character, or an HUD.

7. A method performed by an image processing device, the method comprising:
   referring to an object database stored within a storage unit of the computer, the object database including objects associated with image data that are mutually associated as a tree structure having an object as a node and order values allocated to a child node group of each parent node of the tree structure;
   distributing image data of an object of interest to a layer on a basis of a depth of a tree structure and an order value allocated to each node in a subtree going up from a node corresponding to the object of interest to a root node;
   wherein distributing the image data includes:
   distributing image data of objects having a layer value L within a predetermined range to the same layer, the layer value L of the objects being calculated using the following formula:

$$L = A * \sum_{i=0}^{k} X_i * B^{-i}$$

where "i" denotes a depth of a node, "$X_i$" denotes an order value of a node having a depth equal to "i", each of "A" and "B" denotes a constant, and "k" denotes a depth of the node corresponding to the object of interest; and
   generating an image by superimposing the layers.

8. The method of claim 7, wherein the constant B has a value greater than the maximum value of the order value.

9. The method of claim 7, wherein the constant A satisfies a relationship represented by:

$$A \leq \frac{Lmax}{\left(\sum_{i=0}^{k} X_i * B^{-i}\right)max}$$

where "Lmax" denotes the maximum number of layers to be processed and "$(\Sigma X_i \cdot B^{-i})$ max" denotes the maximum value of "$\Sigma X_i \cdot B^{-i}$".

10. The method of claim 7, wherein the order values are changed dynamically.

11. The method of claim 7, wherein an attribute value of an object is allocated to a parent node of the tree structure, and a child node group of each parent node is formed of an object group having a common attribute value.

12. The method of claim 11, wherein the attribute value includes a background, a character, or an HUD.

* * * * *